US005256463A

United States Patent [19]

Osaka et al.

[11] Patent Number: 5,256,463

[45] Date of Patent: Oct. 26, 1993

[54] METHOD FOR MANUFACTURING COLOR PHOSPHOR SURFACE

[75] Inventors: Norihisa Osaka; Yukihiro Ikegami, both of Nagoya, Japan

[73] Assignee: Mitsubishi Rayon Co., Ltd., Tokyo, Japan

[21] Appl. No.: 687,858

[22] PCT Filed: Sep. 21, 1990

[86] PCT No.: PCT/JP90/01219

§ 371 Date: May 31, 1991

§ 102(e) Date: May 31, 1991

[87] PCT Pub. No.: WO91/05362

PCT Pub. Date: Apr. 18, 1991

[30] Foreign Application Priority Data

Oct. 6, 1989 [JP] Japan ........................ 1-261635

[51] Int. Cl.$^5$ ........................ B32B 3/14

[52] U.S. Cl. ........................ 428/77; 156/67; 156/264; 156/265; 156/281; 427/64; 427/68; 427/157; 428/195; 428/207; 428/213; 428/409; 428/426; 428/690; 428/691; 428/913; 445/30; 445/36; 445/37; 445/47

[58] Field of Search ........................ 428/77, 690.13, 213, 428/195, 207, 409, 426, 913, 691; 313/467, 473, 466, 463, 461; 445/37, 36, 30, 47; 430/26; 156/67, 264, 265, 281; 427/64, 68, 157

[56] References Cited

U.S. PATENT DOCUMENTS

| | | | |
|---|---|---|---|
| 2,676,112 | 4/1954 | Middleton | 427/68 |
| 2,734,013 | 2/1956 | Myers | 156/67 |
| 2,950,222 | 8/1960 | Hinson | 156/67 |
| 3,041,228 | 6/1962 | MacLeod | 156/67 |
| 4,720,655 | 1/1988 | Hinotani | 313/471 |
| 4,743,801 | 5/1988 | Yokoyama | 313/512 |

*Primary Examiner*—Ellis P. Robinson
*Assistant Examiner*—Nasser Ahmad
*Attorney, Agent, or Firm*—Ladas & Parry

[57] ABSTRACT

A method for manufacturing a phosphor screen used in a color CRT takes the steps of multilayering a red phosphor layer, a green phosphor layer, a blue phosphor layer, and a non-luminescent layer being laid between the adjacent color phosphor layer, cutting the multilayered block into filmy pieces toward the thickness, adhering or pressurizing the filmy cut pieces on a glass plate for front panel of the color CRT, and burning the cut pieces. This method makes it possible to efficiently manufacture a high-definition and high-resolution color phosphor screen and form fine RGB stripes. This method, thus, may apply to a small-sized CRT about which the realization of the high-definition and high-resolution color phosphor screen has been difficult.

18 Claims, 2 Drawing Sheets

METHOD FOR MANUFACTURING COLOR PHOSPHOR SURFACE

TECHNICAL FIELD

The present invention relates to a method for efficiently manufacturing a color phosphor screen, that is a luminescent screen of a color cathode-ray tube (referred to as CRT).

TECHNICAL BACKGROUND

A CRT, representatively a TV Braun tube, is designed to have an electronic gun and a phosphor screen such that the electronic gun emits an electronic beam against the phosphor screen to excite the phosphor to be luminous. Recent developments of electronics make visual equipment more various require correspondingly various kinds of CRTs, such as monochromatic, multicolored, large size and very small.

The phosphor screen, in particular, the color phosphor screen is the most important factor for the efficiency of the CRT. The color phosphor screen is composed of dot-like or stripe-like disposition of red, green and blue phosphors so as to receive an electronic beam emitted by the electronic gun.

As the manufacturing methods for the phosphor screen, there have been conventionally known a photo-curing method employing a shadow mask and a printing method.

The former photo-curing method takes the steps of flowing a slurry having a light-curing resin and a phosphor dispersed therein in a front panel of the CRT, exposing the slurry through the shadow mask, fixing predetermined color phosphors at predetermined locations, and burning fixed resin components except the phosphor. Hence, the shadow mask is essential to this photo-curing method.

The latter printing method takes the steps of directly or indirectly printing color phosphor paste on the front panel of the CRT, fixing predetermined colors at predetermined locations, and burning binder-resin components contained in the paste.

Of the foregoing methods for manufacturing the phosphor screen, the shadow mask with fine patterns being engraved is essential to the former photo-curing method. Hence, as the CRT becomes smaller in size or more high-definition, the photo-curing method requires a finer shadow mask. Hence, when manufacturing a quite high-definition screen, it is technically difficult to manufacture the shadow mask therefor. The manufacturing cost of the shadow mask becomes high in the light of the material and the productivity. Moreover, the method for manufacturing a phosphor screen based on the photo-curing method using the shadow mask has some disadvantages that it is costly in the light of the equipment making it possible to execute the method, it needs a troublesome operation for recovering a phosphor, and it suffers from a loss.

The latter printing method is more industrially advantageous in the light of the equipment cost and loss of the phosphor in comparison with the photo-curing method. However, this printing method has some difficulty in directly forming a phosphor screen on the curve of the CRT or manufacturing a small-size high-resolution color phosphor screen requiring 0.1 mm or less fine stripe pattern in the light of a proper printing. Actually, hence, this printing method is not used for manufacturing a small-sized high-resolution phosphor screen as an industrial manufacturing method.

SUMMARY OF THE INVENTION

This invention is based on the foregoing background. It is an object of the present invention to provide a method which is capable of efficiently manufacturing a fine-patterned phosphor screen for a high-resolution color phosphor screen without using a shadow mask.

A method for manufacturing a phosphor screen for a color CRT includes the steps of;

multilayering a red phosphor layer, a green phosphor layer, a blue phosphor layer, and a non-luminous layer in the sequence of a red phosphor layer, a non-luminous layer, a green phosphor layer, a non-luminous layer, a blue phosphor layer, and a non-luminous layer for forming a multilayered material, cutting the multilayered material into thin filmy pieces toward the thickness direction, adhering or pressing those cut pieces onto the glass panel for the front panel of a color CRT, and burning those cut pieces.

According to an aspect of the present invention, the present manufacturing method makes it possible to obtain a multilayered material with a predetermined thickness by multilayering a red phosphor film material composed of organic burnable binder and red phosphor uniformly dispersed therein, a green phosphor film material composed of organic burnable binder and green phosphor uniformly dispersed therein, a blue phosphor film material composed of organic binder and blue phosphor uniformly dispersed therein, and a non-luminous resin film material in the sequence of the red phosphor film, the non-luminous resin film, the green phosphor film, the luminous resin film, the blue phosphor film, and the non-luminous resin film.

According to another aspect of the present invention, the present manufacturing method makes it possible to obtain a multilayered material with a predetermined thickness by multilayering a filmed material composed of red phosphor dispersed in the organic burnable binder, a filmed material composed of green phosphor dispersed in the organic burnable binder, a filmed material composed of blue phosphor dispersed in the organic burnable binder, and a filmed material composed of carbon dispersed in the organic burnable binder in the sequence of the red phosphor film, the carbon film, the green phosphor film, the carbon film, the blue phosphor film, and the carbon film.

According to another aspect of the present invention, the present manufacturing method makes it possible to obtain a multilayered material with a predetermined thickness by coating a red phosphor composed of organic burnable binder and red phosphor uniformly dispersed therein, a green phosphor composed of organic burnable binder and green phosphor uniformly dispersed therein, and a blue phosphor composed of organic burnable binder and blue phosphor uniformly dispersed therein on each film for obtaining a red, a green, and a blue phosphor coating films, and multilayering those films in the sequence of the red, the green, and the blue phosphor coating films.

The color phosphor screen obtained according to the present invention is composed of burned cut pieces of the multilayered material made by multilayering the red luminous phosphor layer, the green phosphor layer, and the blue phosphor layer with a non-luminous layer laid between the adjacent color layers and a front panel of the color CRT having said burned cut pieces located thereon.

According to a preferred embodiment of the color phosphor screen of the present invention, the nonluminous layer is made of a non-luminous resin film.

According to a preferred embodiment of the color phosphor screen of the present invention, a black stripe layer is allowed to be located between the burned cut pieces and the front panel in a manner to substantially allow the stripes to match to the non-luminous layers.

The present invention does not employ the exposure step which has been conventionally used in the photocuring method. Hence, it does not need several devices such as an exposure device and a costly high definition exposure mask, resulting in allowing the phosphor screen of the fine stripe pattern to be manufactured at low cost.

The present invention makes it possible to easily control a thickness of each phosphor layer. Hence, it is possible to easily adjust a stripe width such as a phosphor stripe and a non-luminous stripe of the phosphor screen in the range from thin (about 10 μm) to thick.

Further, the present invention makes it possible to higher accuracy of stripe widths, resulting in obtaining a color phosphor screen having substantially straight stripe patters.

Hence, the invention makes it possible to efficiently manufacture a color phosphor screen having a quite high accuracy and resolution as well as fine RGB stripes formed on the color phosphor screen. This color phosphor screen is allowed to apply to a small-sized CRT. It means that the present invention has a remarkable industrial significance, because it has been conventionally difficult to apply the color phosphor screen to the small-sized CRT.

BRIEF DESCRIPTION OF THE INVENTION

The present invention may employ a phosphor as a known material. To obtain a fine stripe pattern, it is preferable to employ a phosphor with fine particle. Concretely, the red phosphor is $Y_2O_2S$:Eu, the green phosphor is (ZnCd)S:Cu or Al, and the blue phosphor is ZnS:Ag. The grain size is in the range of 3 to 10 μm.

The organic binder in which the phosphor is dispersed is not particularly limited only if it has a highly sinterable resin, allows phosphor or carbon to be uniformly dispersed, and has a uniform film thickness. If part of the organic binder is not burned, the part may cause a black point in manufacturing the CRT and greatly reducing the life of the CRT.

Concretely, the organic binder is cullulose resin, vinyl alcohol resin, or (meth) acrylic resin. Of these materials, the (meth) acrylic resin is a preferable material as the organic binder.

In a preferred embodiment of a step of obtaining a multilayered material in the present invention, the multilayered material can be obtained by multilayering a red phosphor film made of organic binder and red phosphor uniformly dispersed therein, a green phosphor film made of organic binder and green phosphor uniformly dispersed therein, a blue phosphor film made of organic binder and blue phosphor uniformly dispersed therein, and a non-luminous resin film with the non-luminous resin film being laid between the adjacent color phosphor film until the multilayering reaches a predetermined thickness.

The non-luminous resin film of the invention is not particularly limited only if it is non-luminous and excellent burnability. Concretely, it is a film made of the same material as the organic binder.

The concrete method for manufacturing the phosphor film and the non-luminous resin film may take the steps of coating organic solvent diluent of organic binder containing phosphor dispersed therein or organic solvent diluent of organic binder with a roller-coater coating method or a screen printing method and drying the organic solvent for removing it.

Figure 1:
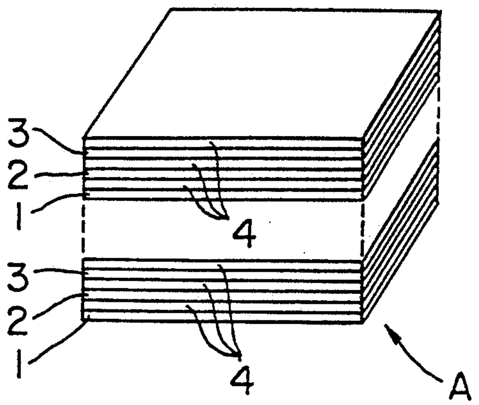
FIG. 1 is a perspective view showing an example of multilayering of a red, a green, and a blue phosphor layers and a non-luminous layer used in the method according to the invention.

A multilayered material A shown in FIG. 1 can be obtained by multilayering a red phosphor film (red phosphor layer 1), a non-luminous resin film (non-luminous layer 4), a greed phosphor film (green phosphor layer 2), a non-luminous resin film (non-luminous layer 4), a blue phosphor film (blue phosphor layer 3), and a non-luminous resin film (non-luminous layer 4) in sequence.

According to another preferred embodiment of the present invention, the multilayered material can be obtained by multilayering a red, a green, and a blue phosphor films and a carbon film until the multilayered material reaches a predetermined thickness. The red phosphor film is made of sinterable organic binder and red phosphor dispersed in the organic binder. The green phosphor, the blue phosphor and carbon films are made in the same manner.

The concrete method for multilayering the phosphor layers and the carbon layer may take the steps of coating organic solvent diluent of organic binder containing phosphor or carbon dispersed therein with a roller-coater coating method or a screen printing method and drying the organic solvent for removing it.

The carbon may use the known carbon like the phosphor. To obtain fine stripe patterns, the carbon particle size should be fine. Concretely, the carbon is high purity graphite whose particle is in a range of 0.3 to 10 μm.

A multilayered material A shown in FIG. 1 can be obtained by multilayering a red phosphor film (red phosphor layer 1), a carbon film (non-luminous layer 4), a greed phosphor film (green phosphor layer 2), a carbon film (non-luminous layer 4), a blue phosphor film (blue phosphor layer 3), and a carbon film (non-luminous layer 4) in sequence.

According to another preferred embodiment of the present invention, the multilayered material can be obtained by multilayering a red, a green, and a blue phosphor coated films which made by the method of coating the phosphor dispersed in the burnable organic binder on the film until the multilayered material reaches a predetermined thickness.

The concrete method for multilayering the phosphor coated films may take the steps of coating on the film organic binder diluent containing phosphor dispersed therein with a roller-coater coating method or a screen printing method and drying the organic solvent for removing it.

The preferable film is a polyvinyl alcohol resin film or an acrylic resin film etc. having excellent burnability. In particular, the most preferable film is an acrylic film which is well-balanced in the light of burnability and flexibility.

In case the black-stripe film is desired, the film containing carbon or graphite uniformly dispersed therein can be used.

A multilayered material A shown in FIG. 1 can be obtained by multilayering a red phosphor layer 1, a film (non-luminous layer 4), a green phosphor layer 2, a film, a blue phosphor layer 3, and a film (non-luminous layer 4) in sequence.

The obtained multilayered material is cut into thin films toward the thickness.

For cutting the multilayered material, a microtome may be used.

The thickness of the phosphor film should be normally 10 to 60 μm.

Figure 2:
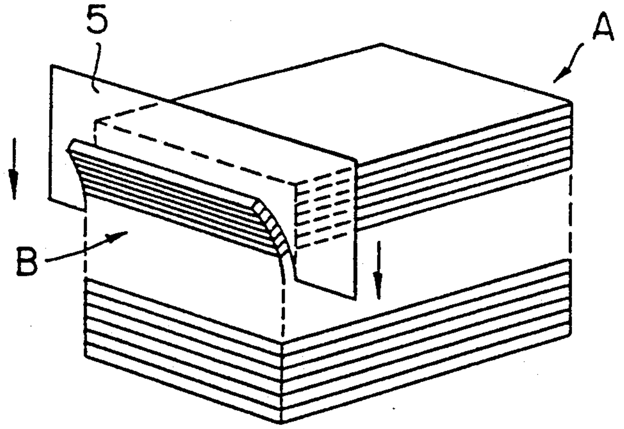
FIG. 2 is an outer appearance view showing how a phosphor film is cut from the multilayered material.

FIG. 2 shows how the multilayered material A is cut toward the thickness by the microtome 5 for obtaining a cut piece B.

Figure 3:
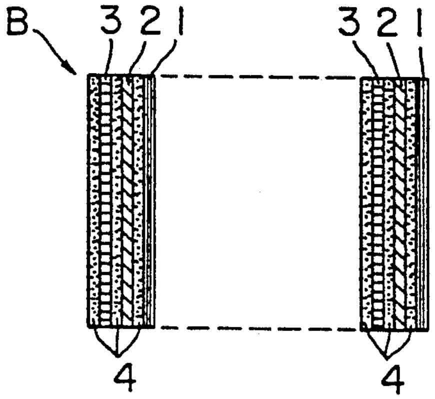
FIG. 3 is a sectional view showing the cut piece.

FIG. 3 is a sectional view showing a phosphor film, that is, the cut piece B having a red 1, a non-luminous layer 4, a green 2, a non-luminous layer 4, a blue 3, and a non-luminous layer 4 ranged in sequence.

The obtained phosphor film is adhered or pressurized on the front panel of a color and burned obtaining a color phosphor screen.

Figure 4:
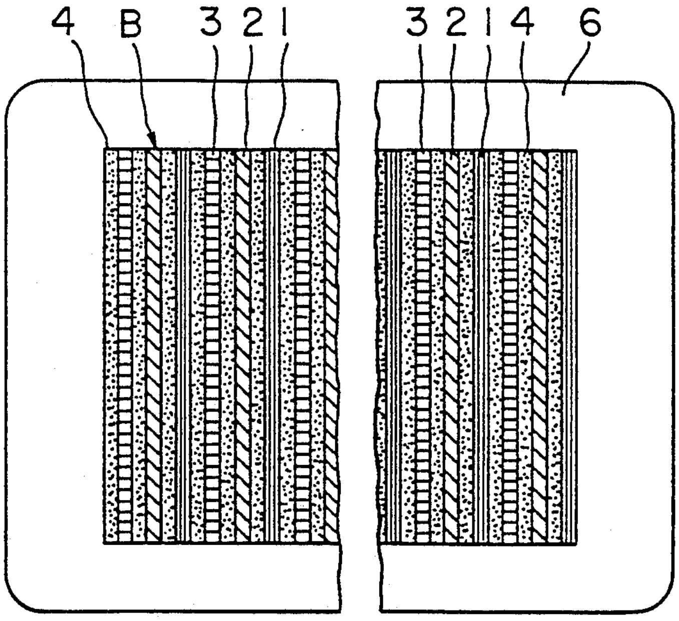
FIG. 4 is a plane view showing an example of a color phosphor screen obtained by the method according to the invention.

FIG. 4 is a plane view showing an example of a color phosphor screen provided on the front panel of the color CRT.

The method for adhering the phosphor film to the front panel may take the steps of coating a water soluble adhesive agent such as water glass or polyvinyl alcohol on the front panel, adhering the phosphor film on the coat, and drying the coat for fixing. The method for pressurizing the phosphor film to the front panel may take the steps of pressing the phosphor film on the glass plate with a rubber roller so as to get the air foams out of the interface therebetween.

The non-luminous layers laid between the adjacent phosphor layers make a contribution to preventing color mixing on the interface between the adjacent colors, positively separating the colors to each one, and improving contrast of an image on a braun tube.

To prevent the contrast of an image on the braun tube from being lowered, it may be possible to use as the phosphor-coating film a film containing carbon particles uniformly dispersed therein or a transparent film, then on the phosphor film the black stripe can be formed.

In the latter, the formation of the black stripe layer is not particularly limited. It may use the known method. For example, it may be produced by vaporizing a non-luminous and low light-transmittance material such as aluminium on the base with a stripe metal mask having a specific width. The method for multilayering a black stripe layer on the phosphor film takes the steps of forming the black stripe layer on the front panel and the phosphor film on the black stripe layer in a manner to allow the black stripe layer to match to the interface between the adjacent color phosphor layers or the non-luminous layer.

PREFERRED EXAMPLES OF IMPLEMENTATION OF THE INVENTION

The present invention will be concretely described on the basis of the examples. The invention is not limited to the following examples unless the examples depart from the scope of the invention.

EXAMPLE A-1

99 parts of isobutyl methacrylate, 1 part of methacrylic acid, and 1.3 parts of azo-isobutylonitrile were reacted in butylcellosolve for ten hours at 80° C.

Each 330 parts of red, green, and blue phosphor (P-22) were dispersed to 100 parts of the obtained acylic resin (Solid) and were mixed. The resulting mixture was adjusted at viscosity of 10000 CPS at 25° C. (with an E-type viscosity meter manufactured by Tokyo Keiki Ltd.) so as to obtain each color phosphor paste.

Next, the resulting color phosphor paste was printed on a glass plate with #100 mesh screen to have a thickness of 20 μm and was dried for ten minutes at 80° C., resulting in manufacturing a color phosphor film.

Next, the acylic resin solution was printed on the color phosphor film with the #100 mesh screen so as to have a thickness of 20 μm so as to form and laminate a non-luminous resin film. Likewise, the color phosphor film, the non-luminous resin film, the blue phosphor film, and the non-luminous resin film were sequentially multilayered so as to produce a three-color phosphor multilayered sheet (referred to as one triplet).

The repetition of the foregoing operation resulted in producing a multilayered sheet consisting of 5 triplets.

Next, the multilayered sheet was stripped off the glass plate and was cut into pieces with a razor. The cut pieces were adhered with the acrylic resin solution for producing 300-triplet phosphor multilayered block.

The resulting multilayered block was cut out toward the thickness to have a thickness of 30 μm by a microtome. It resulted in providing a cut piece having 900 phosphor stripes, that is, a phosphor film.

Next, the stripe metal mask with a pattern width of 20 μm was mounted on the glass plate and aluminium-vaporized for producing a black stripe with a stripe pitch of 20 μm.

The resulting phosphor film was adhered on the black stripe layer adhered on the glass plate with polyvinyl alcohol and was burned at 400° to 450° C. Then, the binder resin and adhesive agent were decomposed for obtaining a color phosphor screen.

As a result of measuring the phosphor film on the glass plate with an optical microscope, it proved that the phosphor screen was accurately and uniformly designed such that the stripe width of one color phosphor was 20±5 μm and the black stripe width was 20±2 μm.

EXAMPLE A-2

The red, green, and blue phosphor bases were obtained in the similar manner to the example 1 except that mineral spirit was used in place of butylcellosolve.

Next, the red phosphor paste was coated on a plastic film with a thickness of 20 μm (acrylic film "acryplene HBS-001" manufactured by Mitubishi Rayon, Ltd.) with a roller coater so as to have a thickness of 20 μm. Then, the resulting film was dried for 15 minutes at 80° C. It resulted in forming a red phosphor layer and obtaining a red phosphor multilayered sheet.

With the same method, the red phosphor multilayered sheet and the blue phosphor multilayered sheet were respectively produced and were multilayered in sequence of red, green and blue with polyvinyl alcohol, thereby producing one triplet.

Next, the multilayered sheet was cut into pieces with a razor and the cut pieces were multilayered with polyvinyl alcohol so as to manufacture the 300-triplet phosphor multilayered block.

The resulting multilayered block was cut out toward the thickness to have a thickness of 30 μm with the microtome for obtaining the cut piece, that is, a phosphor film having 900 phosphor stripes.

The phosphor film was adhered on the glass plate with polyvinyl alcohol and burned at 400° to 450° C. The binder resin and non-fluorescent resin (acryplene) were thus decomposed, i.e. removed, for obtaining a color phosphor screen.

As a result of measuring the phosphor screen with an optical microscope, it proved that the phosphor screen was accurately and uniformly designed such that the stripe width of one color phosphor was 20±5 μm and the black stripe width was 20±2 μm.

EXAMPLE B-1

85 parts of isobutyl methacrylates, 15 parts of 2-hydroxyethyl methacrylate, and 1.5 parts of azo-isobutylonitryle were reacted for ten hours at 80° C. in 200 parts of butylcarbitolacetate.

Each 430 parts of red, green, and blue phosphors (P-22) were dispersed in the obtained acrylic resin and were mixed. The resulting mixture was adjusted at viscosity of 12000 CPS at 25° C. (with an E-type viscosity meter manufactured by Tokyo Keiki, Ltd.) so as to obtain each color phosphor paste.

Next, 125 parts of high purity graphite powder UFG-5S (manufactured by Showa Denko, Ltd.) were dispersed per 100 parts of acrylic resin (solid) and mixed. The resulting mixture was adjusted at viscosity of 25000 cps (25° C.), resulting in obtaining a carbon paste.

Next, the resulting red phosphor paste was printed on the glass plate with the #100 mesh screen so as to have a thickness of 40 μm and was dried for 30 minutes at 150° C., resulting in producing a red phosphor film.

Next, the carbon paste was printed with #300 mesh screen on the red phosphor film for producing a carbon film.

Likewise, the green phosphor film, the carbon film, the blue phosphor film, and the carbon film were multilayered in sequence, resulting in manufacturing a three-color phosphor multilayered sheet (referred to as one triplet).

The repetition of the foregoing operation resulted in producing a multilayered sheet consisting of 5 triplets.

Next, the multilayered sheet was stripped off the glass plate and was cut into pieces with a razor. The cut pieces were adhered with the acrylic resin solution for producing 300-triplet phosphor multilayered block.

The resulting multilayered block was cut out toward the thickness to have a thickness of 30 μm by a microtome. It results in providing a phosphor film having 900 phosphor stripes.

The resulting phosphor film was adhered on the glass plate with polyvinyl alcohol and was burned at 400° to 450° C. Then, the binder resin and adhesive agent were decomposed for obtaining a color phosphor screen.

As a result of measuring the phosphor screen with an optical microscope, it proved that the phosphor screen was accurately and uniformly designed such that the width of one color phosphor was 30±5 μm and the black stripe width was 5±2 μm.

EXAMPLE B-2

79 parts of isobutyl methacrylate, 20 parts of n-butyl acylate, 1 part of methacrylic acid, and 1.3 parts of azo-isobutylonitrile were reacted for ten hours at 80° C. in 200 parts of 3-methoxybutylacetate.

Each 450 parts of red, green, and blue phosphors (P-22) were dispersed in the obtained 100 parts of acrylic resin (solid) and were mixed. The mixture was adjusted at viscosity of 10000 CPS at 25° C. (with an E-type viscosity meter manufactured by Tokyo Keiki, Ltd.) so as to obtain each color phosphor paste.

Next, 125 parts of high purity graphite powder UFG-5S (manufactured by Showa Denko, Ltd.) were dispersed per 100 parts of acrylic resin (solid) and mixed. The resulting mixture was adjusted at viscosity of 20000 cps (25° C.), resulting in obtaining a carbon paste.

Next, the resulting red phosphor paste was printed on the glass plate with the #100 mesh screen so as to have a thickness of 40 μm and was dried for 10 minutes at 80° C., resulting in producing a red phosphor film.

Next, the carbon paste was printed on the red phosphor film with the #300 mesh screen so as to have a thickness of 10 μm, resulting in multilayered sheet.

Likewise, the green phosphor paste, the carbon paste, the blue phosphor paste, and the carbon film were printed in sequence, resulting in manufacturing a three-color multilayered sheet (referred to as one triplet).

The repetition of the foregoing operation resulted in producing a multilayered sheet consisting of 5 triplets.

Next, the multilayered sheet was stripped off the glass plate and was cut into pieces with a razor. The cut pieces were adhered with terpineol for producing 300-triplet phosphor multilayered block.

The resulting multilayered block was cut out toward the thickness to have a thickness of 30 μm by a microtome. It resulted in providing each cut piece having 900 phosphor stripes, that is, a phosphor film.

The resulting phosphor film was adhered on the glass plate with polyvinyl alcohol and was burned at 400° to 450° C. Then, the binder resin and adhesive agent were decomposed for obtaining a color phosphor screen.

As a result of measuring the phosphor screen with an optical microscope, it proved that the phosphor screen was accurately and uniformly designed such that the stripe width of one color phosphor was 30±5 μm and the black stripe width was 5±2 μm.

EXAMPLE C-1

99 parts of isobutyl methacrylate, 1 part of methacrylic acid, and 1.3 parts of azo-isobutylonitrile were reacted for ten hours at 80° C. in 3-methoxybutylacetate.

Each 450 parts of red, green, and blue phosphors (P-22) were dispersed in the resulting 100 parts of acrylic resins (solid) and were mixed. The mixture was adjusted at viscosity of 10000 CPS at 25° C. (with an E-type viscosity meter manufactured by Tokyo Keiki, Ltd.) so as to obtain each color phosphor paste. Each color phosphor paste was printed on Eval ® film with the #100 mesh screen so as to have a thickness of 40 μm and was dried for 10 minutes at 80° C., resulting in producing a red phosphor coating film.

Likewise, the green phosphor coating film and the blue phosphor coating film were multilayered on the red phosphor coating film (referred to as one triplet) in sequence.

The repetition of the foregoing operation resulted in producing a multilayered sheet consisting of 5 triplets.

Next, the multilayered sheet was stripped off the glass plate and was cut into pieces with a razor. The cut pieces were adhered with polyvinyl alcohol for producing 300-triplet phosphor multilayered sheet.

The resulting multilayered sheet was cut out toward the thickness to have a thickness of 30 μm by a microtome. It results in providing a phosphor film having 900 phosphor stripes.

The resulting phosphor film was adhered on the glass plate with polyvinyl alcohol and was burned at 400° to 450° C. for obtaining a color phosphor screen.

As a result of measuring the phosphor screen with an optical microscope, it proved that the phosphor screen was accurately and uniformly designed such that the stripe width of one color phosphor was 30±5 μm.

EXAMPLE C-2

10 parts of polyvinyl alcohol was solved in 90 parts of pure water for producing polyvinyl alcohol solution. Each 350 parts of the red, green, and blue phosphor (P-22) were dispersed in the 100 parts of polyvinyl alcohol (solid) and were mixed. The mixture was adjusted at viscosity of 1000 CPS at 25° C. (with an E-type viscosity meter manufactured by Tokyo Keiki, Ltd.) so as to obtain each color phosphor paste. Each color phosphor paste was coated on an acrylic film (acryplene HBS001 manufactured by Mitubishi Rayon, Ltd.) with an applicator in 40 μm thickness and was dried for 10 minutes at 90° C., resulting in producing a red phosphor coating film.

Likewise, the green phosphor coating film and the blue phosphor coating film were multilayered on the red phosphor coating film (referred to as one triplet) in sequence with the polyvinyl alcohol.

The repetition of the foregoing operation resulted in producing a multilayered sheet consisting of 5 triplets.

Next, the multilayered sheet was stripped off the glass plate and was cut into pieces with a razor. The cut pieces were adhered with the polyvinyl alcohol for producing 250-triplet phosphor multilayered sheet.

The resulting multilayered sheet was cut out toward the thickness to have a thickness of 35 μm by a microtome. It results in providing a phosphor film having 750 phosphor stripes.

Next, a stripe metal mask with a pattern width of 20 μm was mounted on the glass plate and was aluminium-vaporized so as to form the black stripe layer with a stripe width of 20 μm on the glass plate.

Then, the phosphor film having 750 stripes was adhered on the black stripe layer with polyvinyl alcohol in a manner to allow the interface between the stripes to match to the black stripe. Then, the multilayered sheet was burned at 400° to 450° C. for obtaining a color phosphor screen.

As a result of measuring the phosphor screen with an optical microscope, it proved that the phosphor screen was accurately and uniformly designed such that the stripe width of one color phosphor between the black stripes was 20±5 μm.

REFERENCE D-1

99 parts of isobutyl methacrylate, 1 part of methacrylic acid, and 1.3 parts of azo-isobutylonitrile were reacted for ten hours at 80° C. in 3-methoxybutylacetate.

Each 450 parts of red, green, and blue phosphors (P-22) were dispersed in the resulting 100 parts of acrylic resins (solid) and were mixed. The mixture was adjusted at viscosity of 10000 CPS at 25° C. (with an E-type viscosity meter manufactured by Tokyo Keiki, Ltd.) so as to obtain each color phosphor paste. Each color phosphor paste was printed on a glass plate with the #100 mesh screen so as to have a thickness of 40 μm and was dried for 10 minutes at 80° C., resulting in producing a red phosphor coating film.

Likewise, the green phosphor coating film and the blue phosphor coating film were multilayered on the red phosphor coating film (referred to as one triplet) in sequence. The multilayered sheet was a three-color phosphor multilayered sheet.

The repetition of the foregoing operation resulted in producing a multilayered sheet consisting of 5 triplets.

Next, the multilayered sheet was stripped off the glass plate and was cut into pieces with a razor. The cut pieces were adhered with the terpineol for producing 300-triplet phosphor multilayered sheet.

The resulting multilayered sheet was cut out toward the thickness to have a thickness of 30 μm by a microtome. It resulted in providing a phosphor film having 900 stripes.

The resulting phosphor film was adhered on the glass plate with polyvinyl alcohol and was burned at 400° to 450° C. for obtaining a color phosphor screen.

As a result of measuring the phosphor screen with an optical microscope, it proved that the phosphor screen was accurately and uniformly designed such that the stripe width of one color phosphor was 30±5 μm.

REFERENCE D-2

90 parts of isobutyl methacrylate, 10 parts of 2-hydroxymethacrylate, and 1.3 part of azo-isobutylonitrile were reacted for ten hours at 80° C. in butylcarbitolacetate.

Each 350 parts of red, green, and blue phosphors (P-22) were dispersed in the resulting 100 parts of acrylic resin (solid) and were mixed. The mixture was adjusted at viscosity of 10000 CPS at 25° C. (with an E-type viscosity meter manufactured by Tokyo Keiki, Ltd.) so as to obtain each color phosphor paste. Each color phosphor paste was printed on a glass plate with the #100 mesh screen so as to have a thickness of 50 μm and was dried for 100 minutes at 90° C., resulting in producing a red phosphor coating film.

Likewise, the green phosphor coating film and the blue phosphor coating film were multilayered on the red phosphor coating film in sequence for producing one triplet.

The repetition of the foregoing operation resulted in producing a multilayered sheet consisting of 5 triplets.

Next, the multilayered sheet was stripped off the glass plate and was cut into pieces with a razor. The cut pieces were adhered with the terpineol for producing 250-triplet phosphor multilayered sheet.

The resulting multilayered sheet was cut out toward the thickness to have a thickness of 35 μm by a microtome. It resulted in providing a phosphor film having 750 stripes.

Next, the stripe metal mask having a pattern width of 20 μm was mounted on a glass plate and was aluminium-vaporized so as to form a black stripe layer having a stripe width of 20 μm on the glass plate.

Then, the phosphor film having 750 stripes was adhered on the black stripe layer multilayered on the glass plate with polyvinyl alcohol in a manner to allow the interface between the stripes to match to the black stripe. Then, the multilayered sheet was burned at 400° to 450° C., resulting in obtaining a color phosphor screen.

As a result of measuring the phosphor screen with an optical microscope, it proved that the phosphor screen was accurately and uniformly designed such that the stripe width of one color phosphor was 20±5 μm and the black stripe was matched between the phosphor stripes.

INDUSTRIAL UTILIZATION

The present invention is preferable to manufacturing of a color CRT having a color phosphor screen as a component.

What is claimed is:

1. In a method of manufacturing a phosphor screen for a color CRT, said method comprising the steps of:

multilayering successive red, green and blue phosphor layers with a non-luminescent resin layer between each adjacent pair of said phosphor layers into a multilayered block;

cutting said multilayered block in a direction of a thickness of said layers into thin film;

adhering with an adhesive or pressing at least one of said thin film onto a translucent front panel for a color CRT; and burning said thin film on said front panel for decomposition removal of at least a portion of each said non-luminescent layer and any of said adhesive.

2. The method according to claim 1, wherein said red, green and blue phosphor layers are film mixtures of red, green and blue phosphors, respectively, uniformly dispersed in a burnable organic binder and.

3. The method according to claim 2, wherein one of said red, green and blue film mixtures and one said non-luminescent resin film are coated on a base surface and dried.

4. The method according to claim 1, wherein said red, green and blue phosphor layers are film mixtures of red, green and blue phosphors, respectively, and carbon uniformly dispersed in a burnable organic binder, and each of said non-luminescent layer is a carbon film.

5. The method according to claim 4, wherein one of said red, green and blue film mixtures and one said carbon film are coated on a base surface and dried.

6. The method according to claim 1, wherein said red, green and blue phosphor layers are mixtures of red, green and blue phosphor, respectively, uniformly dispersed in a burnable organic binder, coated on a base and dried.

7. A color phosphor screen comprising:

a multilayered thin film prepared from a multilayered phosphor containing block having a plurality piece multilayered of red phosphor, green phosphor and blue phosphor layers with non-luminescent resin layers between each adjacent pair of said layers on a glass panel, whereby to form a front panel of a color CRT after burning non-luminescent material from said thin film.

8. A color phosphor screen according to claim 7, wherein a black stripe layer is located between said burned cut multilayered thin film and said panel in a manner to allow said stripes to match to said non-luminescent layers.

9. The method according to claim 2, wherein said multilayering comprises stacking successive ones of said films with said red, green and blue phosphors, respectively, into said multilayered block, said multilayered block comprising more than one of said films with each of said red, green and blue phosphors.

10. The method according to claim 3, wherein said multilayering comprises stacking successive ones of said films with said red, green and blue phosphors, respectively, into said multilayered block, said multilayered block comprising more than one of said films with each of said red, green and blue phosphors.

11. The method according to claim 4, wherein said multilayering comprises stacking successive ones of said films with said red, green and blue phosphors, respectively, into said multilayered block, said multilayered block comprising more than one of said films with each of said red, green and blue phosphors.

12. The method according to claim 5, wherein said multilayering comprises stacking successive ones of said films with said red, green and blue phosphors, respectively, into said multilayered block, said multilayered block comprising more than one of said films with each of said red, green and blue phosphors.

13. The method according to claim 6, wherein said multilayering comprises stacking successive ones of said films with said red, green and blue phosphors, respectively, into said multilayered block, said multilayered block comprising more than one of said films with each of said red, green and blue phosphors.

14. The method according to claim 2, wherein said multilayering comprises stacking successive ones of said films with said red, green and blue phosphors into a multilayered sheet, cutting said sheet into sections and stacking said sections into said multilayered block.

15. The method according to claim 3, wherein said multilayering comprises stacking successive ones of said films with said red, green and blue phosphors into a multilayered sheet, cutting said sheet into sections and stacking said sections into said multilayered block.

16. The method according to claim 4, wherein said multilayering comprises stacking successive ones of said films with said red, green and blue phosphors into a multilayered sheet, cutting said sheet into sections and stacking said sections into said multilayered block.

17. The method according to claim 5, wherein said multilayered comprises stacking successive ones of said films with said red, green and blue phosphors into a multilayered sheet, cutting said sheet into sections and stacking said sections into said multilayered block.

18. The method according to claim 6, wherein said multilayering comprises stacking successive ones of said films with said red, green and blue phosphors into a multilayered sheet, cutting said sheet into sections and stacking said sections into said multilayered block.

* * * * *